(12) United States Patent
Safiol

(10) Patent No.: US 7,676,882 B1
(45) Date of Patent: Mar. 16, 2010

(54) DEBRIS COLLECTION DEVICE

(76) Inventor: Peter G. Safiol, 7 Watkins La., Southborogh, MA (US) 01772

( * ) Notice: Subject to any disclaimer, the term of this patent is extended or adjusted under 35 U.S.C. 154(b) by 649 days.

(21) Appl. No.: 11/456,388

(22) Filed: Jul. 10, 2006

(51) Int. Cl.
*A47L 13/52* (2006.01)

(52) U.S. Cl. .................. 15/257.1; 15/257.3; 15/257.7; 15/415.1

(58) Field of Classification Search ............... 15/257.1, 15/257.3, 257.7, 415.1; 141/331, 344; D32/74; *A47L 13/52*

See application file for complete search history.

(56) References Cited

U.S. PATENT DOCUMENTS

| | | | | | |
|---|---|---|---|---|---|
| 325,304 | A | * | 9/1885 | Wynkoop | 15/257.3 |
| 570,026 | A | * | 10/1896 | Koehler | 15/257.3 |
| 655,384 | A | * | 8/1900 | Welder | 15/257.1 |
| 689,156 | A | * | 12/1901 | Benham | 15/257.3 |
| 944,490 | A | * | 12/1909 | Lotze | 15/257.3 |
| 1,287,406 | A | * | 12/1918 | Olsen | 15/257.3 |
| 1,593,609 | A | * | 7/1926 | Weidlich | 15/257.3 |
| 1,847,476 | A | * | 3/1932 | Fuhr | 15/257.1 |
| 2,286,113 | A | * | 6/1942 | Schlacter | 15/41.1 |
| D161,681 | S | * | 1/1951 | Dreyfus | D32/33 |
| 3,412,419 | A | * | 11/1968 | Barnhart | 15/257.1 |
| 3,490,501 | A | * | 1/1970 | Rene et al. | 141/84 |
| 3,639,937 | A | * | 2/1972 | Sweeney | 15/104.8 |
| 3,934,661 | A | | 1/1976 | Sauerwein et al. | |
| 4,631,774 | A | * | 12/1986 | Kania | 15/257.1 |
| 4,820,320 | A | | 4/1989 | Cox | |
| 5,080,149 | A | * | 1/1992 | Peoples | 141/337 |
| 5,088,531 | A | * | 2/1992 | Wade | 141/108 |
| D381,155 | S | | 7/1997 | Powers | |
| 6,053,674 | A | | 4/2000 | Thompson | |
| 6,276,410 | B1 | * | 8/2001 | Esmeralda | 141/332 |

* cited by examiner

*Primary Examiner*—David A Redding

(57) ABSTRACT

A debris collection device for collecting debris along a vertical surface during drilling of the vertical surface includes a tray being positionable adjacent a vertical surface and under a drill to collect falling debris when the vertical surface is drilled. The tray includes a bottom wall and a perimeter wall being coupled to and extending upwardly from the bottom wall. The perimeter wall and the bottom wall define a collection space to receive the debris.

3 Claims, 4 Drawing Sheets

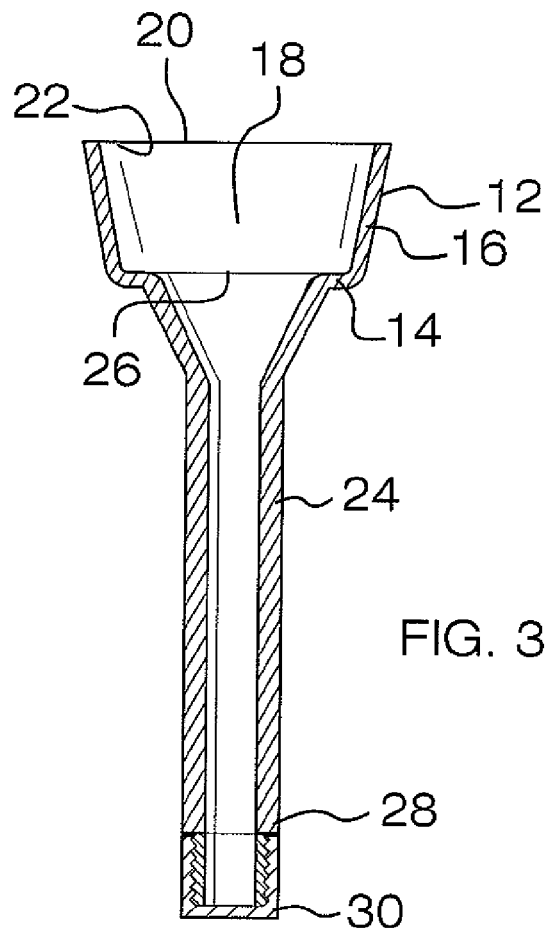
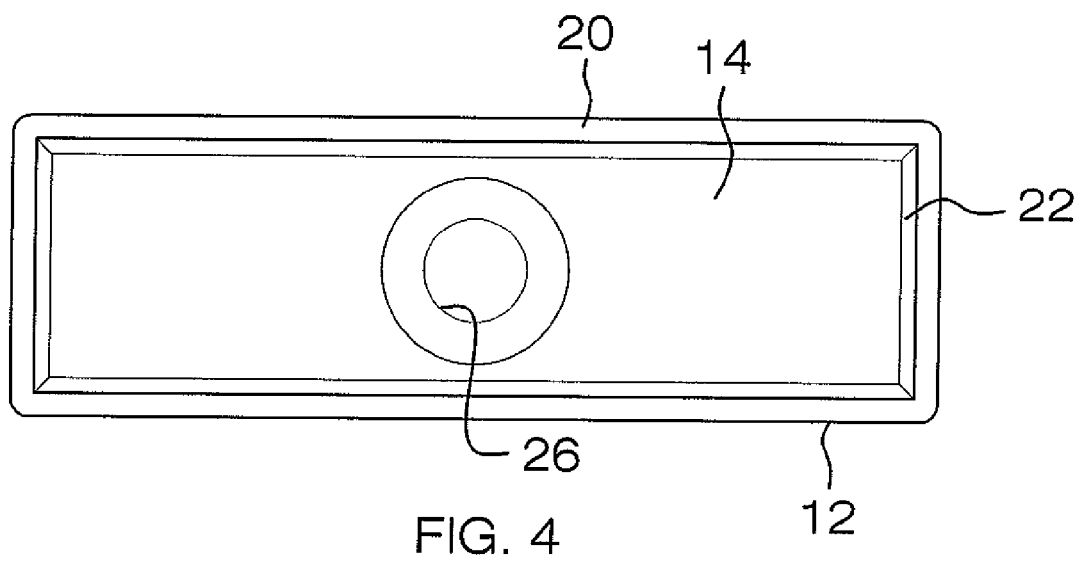
FIG. 3
FIG. 4

DEBRIS COLLECTION DEVICE

BACKGROUND OF THE INVENTION

1. Field of the Invention

The present invention relates to dust collectors and more particularly pertains to a new dust collector for collecting debris along a vertical surface during drilling of the vertical surface.

2. Description of the Prior Art

The use of dust collectors is known in the prior art. The prior art teaches collectors that are positioned around a drill bit and therefore block the view of the drill bit as it is being used.

While these devices fulfill their respective, particular objectives and requirements, the need remains for a device that has certain improved features that allows for the area being drilled to be viewed during the drilling process. Additionally, the device is positioned away from a drill to inhibit accidental injury from the drill slipping during use.

SUMMARY OF THE INVENTION

The present invention meets the needs presented above by generally comprising a tray being positionable adjacent a vertical surface and under a drill to collect falling debris when the vertical surface is drilled. The tray includes a bottom wall and a perimeter wall being coupled to and extending upwardly from the bottom wall. The perimeter wall and the bottom wall define a collection space to receive the debris.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view of the present invention taken along line 3-3 of FIG. 1.

FIG. 4 is a top view of the present invention.

DESCRIPTION OF THE PREFERRED EMBODIMENT

Figure 1:
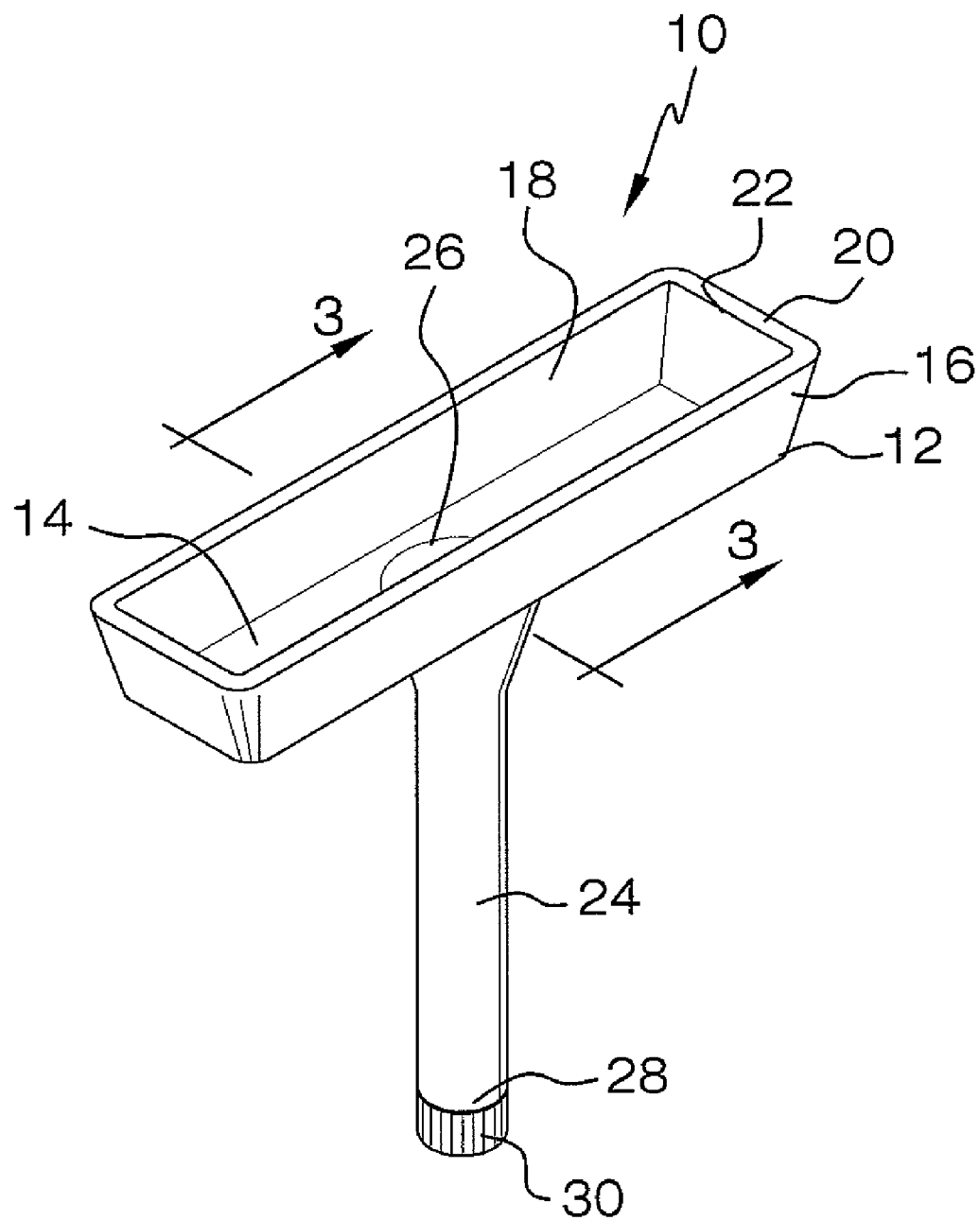
FIG. 1 is a perspective view of a debris collection device according to the present invention.
Figure 2:
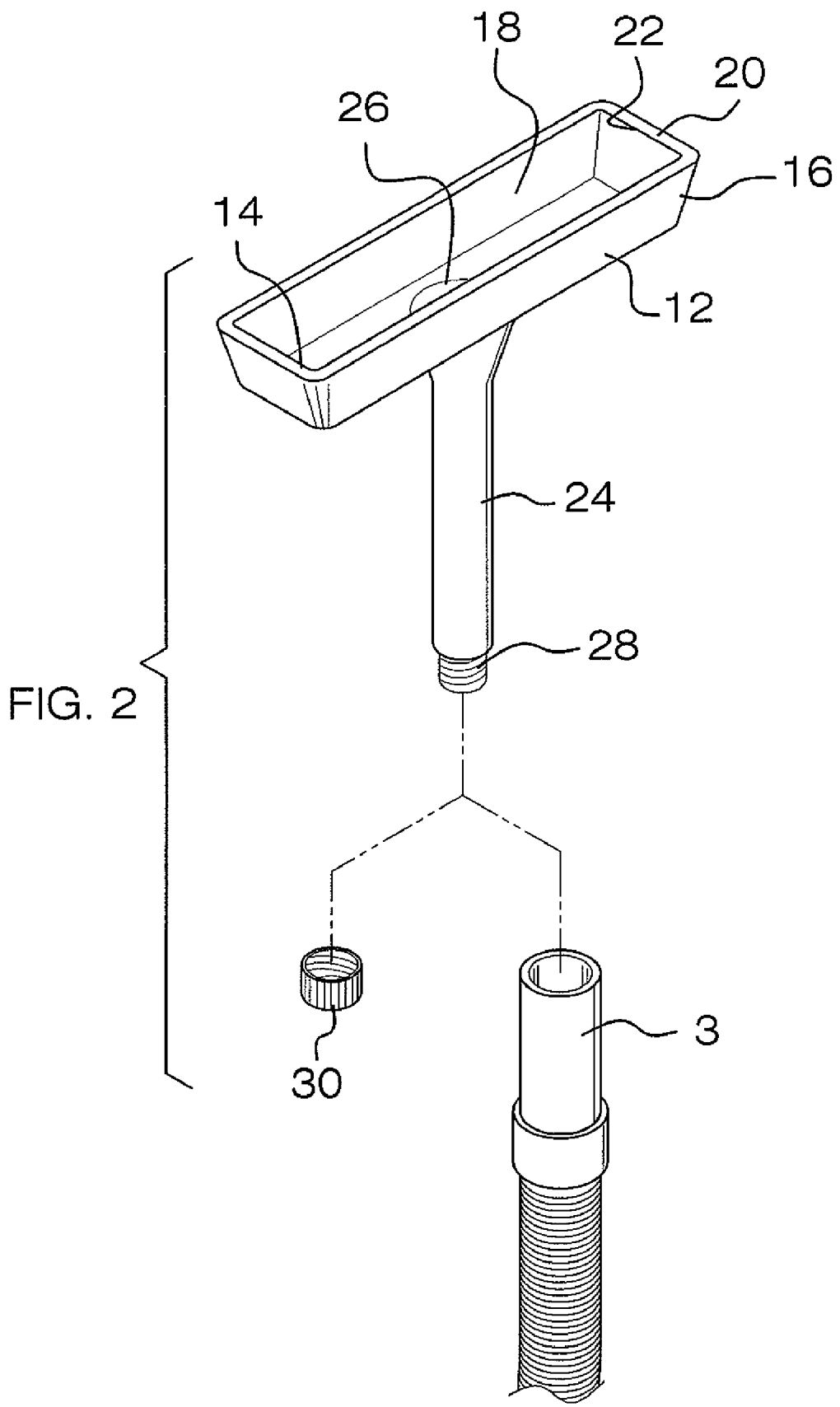
FIG. 2 is an exploded perspective view of the present invention.
Figure 5:
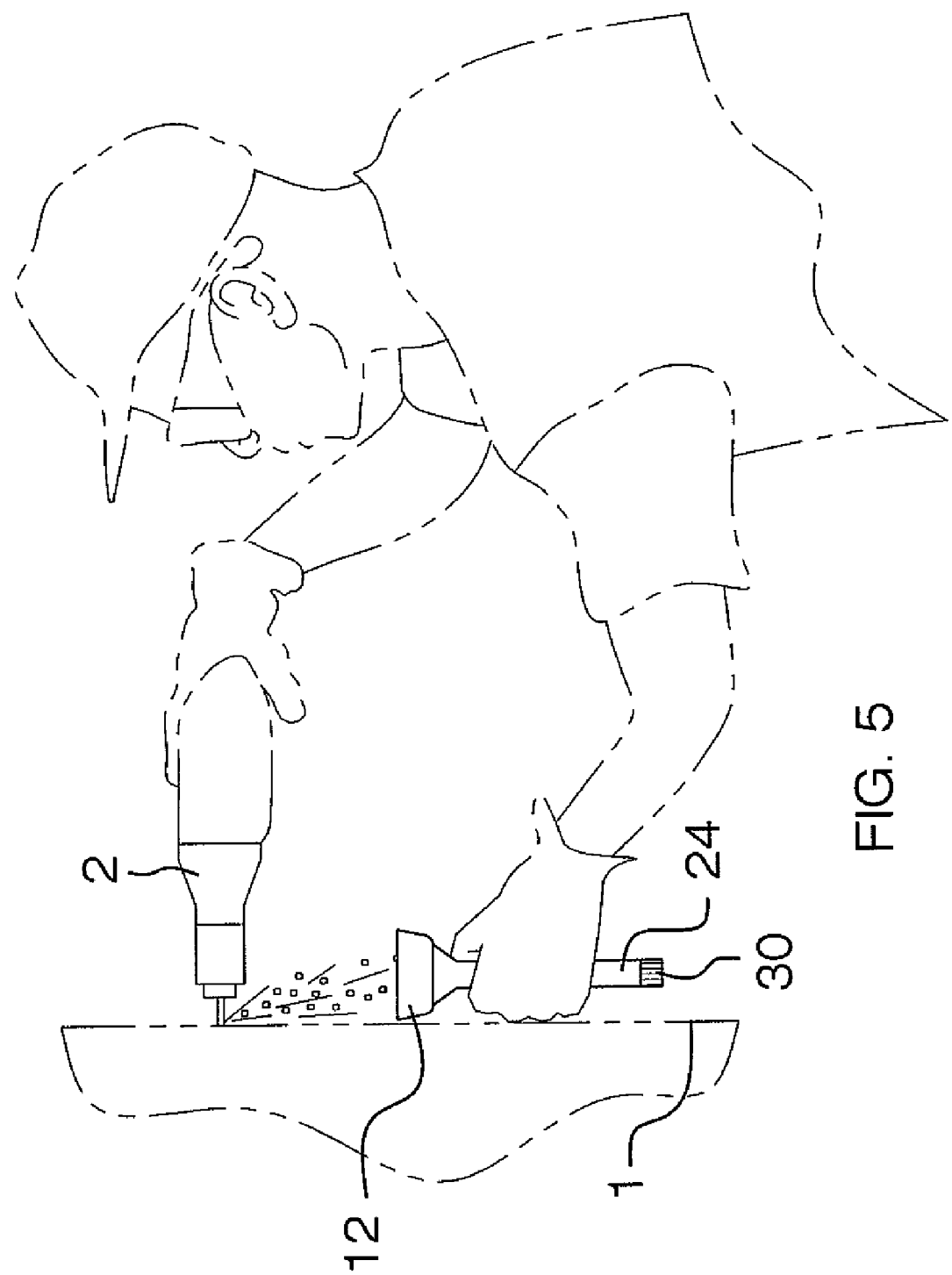
FIG. 5 is a side view of the present invention shown in use.

With reference now to the drawings, and in particular to FIGS. 1 through 5 thereof, a new dust collector embodying the principles and concepts of the present invention and generally designated by the reference numeral 10 will be described.

As best illustrated in FIGS. 1 through 5, the debris collection device 10 generally comprises a tray 12 being positionable adjacent a vertical surface 1 and under a drill 2 to collect falling debris when the vertical surface 1 is drilled. The tray 12 includes a bottom wall 14 and a perimeter wall 16 coupled to and extending upwardly from the bottom wall 14. The perimeter wall 16 and the bottom wall 14 define a collection space 18 to receive the debris. The perimeter wall 16 includes a terminal edge 20 positioned opposite the bottom wall 14 defining an open end 22 to permit the debris to enter the collection space 18. The tray 12 has a substantially rectangular configuration to allow a length of the tray 12 to be positionable against the vertical surface 1 and provide a greater coverage for collecting the debris.

A transfer tube 24 is coupled to the tray 12. The transfer tube 24 is graspable to facilitate manipulation of the tray 12. The transfer tube 24 is coupled to the bottom wall 14 of the tray 12 and in fluid communication with an aperture 26 extending through the bottom wall 14. The transfer tube 24 receives debris passing through the aperture 26 from the tray 12. A free end 28 of the transfer tube 24 is positioned opposite the tray 12. The free end 28 is selectively engaged to a vacuum 3 to vacuum the debris as it is collected in the tray 12 and the transfer tube 24. A cap 30 is couplable to the free end 28 of the transfer tube 24 opposite the tray 12 when the vacuum 3 is removed from the transfer tube 24. The cap 30 inhibits debris collected in the transfer tube 24 from exiting the transfer tube 24 when the cap 30 is coupled to the transfer tube 24.

In use, the transfer tube 24 is grasped and the tray 12 is positioned against the vertical surface 1 and positioned under an area to be drilled. As the drill 2 is placed against the vertical surface 1 and drills the vertical surface 1, debris falls into the tray 12 and into the transfer tube 24. The vacuum 3 connected to the free end 28 of the transfer tube 24 vacuums the debris from the transfer tube 24 and the tray 12. The cap 30 can be connected to the free end 28 of the transfer tube 24 to prevent debris from exiting the transfer tube 24 when the vacuum 3 is not being used.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A debris collection device for collecting debris generated while drilling a vertical surface, said device comprising:
    a tray being positionable adjacent the vertical surface and under a drill to collect falling debris when the vertical surface is drilled, said tray including a bottom wall and a perimeter wall being coupled to and extending upwardly from said bottom wall, said perimeter wall and said bottom wall defining a collection space to receive the debris;
    a transfer tube being coupled to said tray, said transfer tube being graspable to facilitate manipulation of said tray, said transfer tube being coupled to said bottom wall of said tray and in fluid communication with an aperture extending through said bottom wall, said transfer tube receiving debris passing through said aperture from said tray, said transfer tube having a free end positioned opposite said tray;

a vacuum being removably engaged with said free end to vacuum the debris as it is collected in said tray and said transfer tube; and a cap being couplable to said free end of said transfer tube opposite said tray when the vacuum is removed from said transfer tube, said cap inhibiting debris collected in said transfer tube from exiting.

2. The device according to claim 1, wherein said perimeter wall includes a terminal edge positioned opposite said bottom wall defining an open end to permit the debris to enter said collection space.

3. The device according to claim 1, wherein said tray has a substantially rectangular configuration to allow a length of said tray to be positionable against the vertical surface and provide a greater coverage for collecting the debris.

* * * * *